Patented Mar. 14, 1950

2,500,825

UNITED STATES PATENT OFFICE 2,500,825

PTEROYLDIGLUTAMYLGLUTAMIC ACID AND PREPARATION OF THE SAME

Brian L. Hutchings, Pearl River, N. Y., assignor to American Cyanamid Company, New York, N. Y., a corporation of Maine No Drawing. Application June 24, 1947, Serial No. 756,803

11 Claims. (Cl. 260—251)

This invention relates to pteroyldiglutamylglutamic acid, its salts and esters, and to a method of producing the same.

The substance called folic acid is a growth-promoting material having vitamin-like properties. Because of this it is a useful member of the so-called vitamin B complex. It is known to have a stimulating effect upon the growth of chicks, rats, and other animals, and upon bacteria including Streptococcus lactis, Lactobacillus casei, and others. Besides being known as folic acid, this substance is sometimes called vitamin $B_c$, factor U., L. casei factor, and chick growth factor. Although the exact structure of the folic acid molecule was not known at the time of filing application Serial No. 543,493, July 4, 1944, now forfeited, of which this is a continuation-in-part, a recent announcement in Science, volume 103, page 667, May 31, 1946, by myself and others, states that L. casei factor (folic acid) isolated from liver has the following formula:

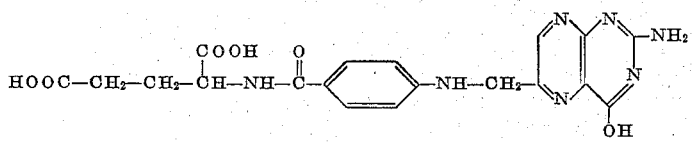

The chemical name of this substance was given as N-[4-{[(2-amino-4-hydroxy-6-pteridyl)methyl]amino}benzoyl] glutamic acid. For purpose of brevity the material was called pteroylglutamic acid. Since publication of the notice, this term has found acceptance by scientists in the chemical and biological fields.

Folic acid has been isolated in crystalline form from various sources. The substance occurs in the foliage of various plants. It has also been isolated from mushrooms, yeast, and animal sources including liver and kidneys. As indicated by its most common name, it is acidic in character. Because of the fact that the new substance of the present invention produced by the fermentation process to be described in detail hereinafter possesses many of the same physiological properties of folic acid derived from liver, yeast, spinach, and other sources, it was believed to be closely related thereto. I have found, however, that the new physiologically active substance of the present invention differs from the previously described folic acid now known as pteroylglutamic acid in having three glutamic acid molecules instead of only one. These are joined together by a peptide linkage and attached to the benzoyl group as in the case of pteroylglutamic acid so that the new growth promoting substance of the present invention may be properly called N-[4-{[(2-amino-4-hydroxy-6-pteridyl) methyl]amino}benzoyl]diglutamylglutamic acid. Because of the unwieldy nature of the name, it will be referred to hereinafter and in the claims as "pteroyldiglutamylglutamic acid." The term "pteroyldiglutamylglutamic acid" as used herein and in the claims shall mean the growth-promoting substituents having the above named structure.

Because of the physiological activity of folic acid, it has become an important item in the physician's armamentarium. Inasmuch as the new pteroyldiglutamylglutamic acid of the present invention possesses many of the same physiologically active properties of liver folic acid and as it appears to possess additional properties not possessed by pteroylglutamic acid, it is highly desirable that a method of producing reasonably large quantities of the material be made available. Previously-known sources of the new material were not known. I have discovered, however, that when bacteria of the Corynebacterium genus are grown on suitable growth media, pteroyldiglutamylglutamic acid is produced and can be isolated therefrom in surprisingly high yields.

The Corynebacteria are generally characterized as a genus by their occurrence as gram positive, pleomorphic, rod-like forms usually arranged in a palisade. They often occur with club-shaped swellings at the poles. They are non-acid fast, non-motile, and non-sporing. They grow aerobically and never form gas in carbohydrate media. The most common type species of the genus is Corynebacterium diphtheriae. Most of the species of this genus are non-pathogenic and include the species C. hofmannii, C. xerosis, C. pyogenes, C. renale, C. acne, C. typhi, C. murium, C. ovis, etc.

Although I have produced pteroyldiglutamylglutamic acid in substantial amounts by the fermentation of various species of the Corynebacterium genus, including C. flavidum, C. simplex, C. tumescens, C. hoagii, and types III, VI, VII, VIII, IX, X, and XI obtained from the American Type Culture Collection at Georgetown University, Washington, D. C., I have discovered a hitherto unreported species of bacteria which produces pteroyldiglutamylglutamic acid in very much better yields than other species of this genus under analogous conditions. This microorganism is apparently a strain variant of C. hofmannii, differing in that the usual C. hofmannii is achromogenic, whereas my new strain is a chromogen producing a yellow, water-insoluble pigment. Otherwise, the morphology of this organism is characterized as follows: when grown on Loeffler slants at 30° C. for 24 hours, there is found to be a predominance of short plump rods of 2.6 x 1.3 microns and long rods of 5.2 x 1.3 microns. At 48 hours the cells are more coccoid with many coccus forms of 1.3 x 1.3 microns.

The new organism, in common with the Corynebacteria, is gram positive and non-acid fast. The presence of polar granules and some barred forms may be demonstrated by staining with methylene blue. The organism appears to be non-motile. Neither acid nor gas is produced from carbohydrate media. Nitrates are reduced to nitrites. It is a slow liquefier of gelatin, it hemolyzes blood agar, and it is negative to the methyl red and acetyl methyl carbinol tests. It is a non-pathogenic diphtheroid. When first isolated the organism did not form spores, but continued culture finally resulted in spore formation.

Before considering the details of the fermentation process of the present invention, it is pointed out that cell formation and pteroyldiglutamylglutamic acid production are not necessarily related, and those factors which bring about a maximum growth of the organism do not necessarily result in the largest production of pteroyldiglutamylglutamic acid. It is also to be noted that the pteroyldiglutamylglutamic acid that is produced is partially secreted into the growth medium and that under normal conditions about half of the pteroyldiglutamylglutamic acid formed is present in the medium, whereas the other half is present in the cells. Accordingly, pteroyldiglutamylglutamic acid may be recovered from either the medium or the cells or both. The pteroyldiglutamylglutamic acid in the cells may be recovered by autoclaving the ferment or by enzymatic digestion thereof.

To obtain the highest yields of pteroyldiglutamylglutamic acid from the fermentation process the growth medium must contain certain constituents and should contain others. These constituents should be present in certain concentrations and should bear certain relationships to each other, as will hereinafter be described.

As might be expected, phosphates are necessary for the growth of the Corynebacterium organism. When the growth medium contains no phosphates, no pteroyldiglutamylglumatic acid is produced. On the other hand, when excess quantities of phosphates are present, the pteroyldiglutamylglutamic acid production per milliliter of medium is reduced. Ordinarily, I use slightly more phosphates than are necessary for the growth of the organism so that a buffer action is obtained. Generally, to obtain the desired pH I use a mixture of phosphates, such as mono-potassium dihydrogen phosphate and dipotassium mono-hydrogen phosphate in substantially equal amounts. It will be understood, of course, that other phosphate salts may be employed in different proportions and that the necessary phosphates may be obtained from other constituents of the growth medium. The total phosphates in the growth medium, expressed as dipotassium mono-hydrogen phosphate, should be from about 25 mg. to about 200 mg. of phosphate per 100 ml. of growth liquor.

The iron content of the medium is also of importance. The iron content, expressed as

$FeSO_4.7H_2O$ may range from about 0.1 mg. to about 20 mg. per 100 ml. of growth liquor. Optimum production of pteroyldiglutamylglutamic acid appears to take place in most media at an iron content of about 4 to 8 mg. of ferrous sulfate heptahydrate per 100 ml. of growth liquor. As in the case of the phosphate content, the source of the iron salt is not particularly important, and the requisite iron content may be obtained from other constituents added to the growth liquor.

Certain other elements including magnesium, potassium, etc., are also required in small amounts by the growing organism. Ordinarily, however, these elements, and particularly those required in traces, are supplied in sufficient quantities by the other components of the growth liquor. Ordinary tap water, for example, contains substantial quantities of magnesium, calcium, iron, and other elements. Most of the other components of the growth medium also contain mineral impurities of various kinds in varying amounts, and it is not usually necessary to add separate amounts of the mineral elements other than those already mentioned.

The growth medium must have a carbonaceous material present therein to satisfy the carbon requirements of the growing organism. I prefer to satisfy the carbon requirements by the addition to the liquor of water-soluble carbohydrates, preferably mono-saccharides such as glucose. Glucose is preferred because of its low cost. Other carbon sources have been used with good results, some giving better yields than are obtainable with glucose. Some of the carbon sources that I have used with good results include d-levulose, d-mannose, d-arabinose, sucrose, i-inositol, d-galactose, glycerol, sodium citrate, and others. Other non-toxic, water-soluble, carbonaceous materials, particularly of plant and animal origin, may also be used. Some of the carbon requirements of the growing organism may be obtained from the amino acids present in the growth medium.

In general, the higher the concentration of available carbonaceous substance in the growth medium the greater is the production of pteroyldiglutamylglutamic acid. However, there is a limit to the amount of carbonaceous material that can be utilized by the organism. For example, in the case of glucose it appears that the Corynebacteria can utilize all of it up to about 4% under optimum conditions. When more glucose, or other carbohydrate is present, it is not completely metabolized.

One of the important factors in securing optimum yields of pteroyldiglutamylglutamic acid resides in the recovery of the acid from the fermented growth liquor by adsorption on charcoal or other suitable adsorbent. In this connection I have found that when the growth liquor contains an excess of unmetabolized glucose, this material adversely affects the subsequent recovery steps. I prefer, therefore, that the growth medium contain no more carbohydrate substance than can be utilized by the Corynebacteria in the fermentation process. Since 4% by weight based on the total weight of the liquor appears to be the maximum amount of glucose that can be utilized, my preferred growth medium contains a maximum of 4% of glucose or analogous carbohydrate substance. Smaller amounts down to about 1% of glucose may, of course, be used with decreased yields of pteroyldiglutamylglutamic acid.

As in most fermentation processes, nitrogen is required. In my process I usually obtain the nitrogen from an amino acid such as glycine, although it will be understood that other amino acids or mixtures thereof may also be used. Other amino acids such as alanine, methionine, valine, serine, cysteine, lysine, and the like, may be used in place of glycine as a source of nitrogen for the Corynebacteria. It will also be understood that the nitrogen requirements of the invention may also be met, in whole or in part, by the addition of proteinaceous animal or vegetable materials such as liver cake, fish meal, casein, yeast, distillers' slops, corn steep liquor, soya bean meal, or the like, preferably in digested or hydrolyzed form wherein free amino acids are available, or may be made available, for the growing organism. Synthetic sources of nitrogen such as nitrates may also be added to the growth medium to supply nitrogen to the process.

The carbon-nitrogen ratio also appears to be critical in the production of pteroyldiglutamylglutamic acid through fermentation by the Corynebacterium organism. In a growth medium containing 2% of glucose, the maximum pteroyldiglutamylglutamic acid production was obtained when the liquor contained 0.4% of glycine. When the glycine content was 2%, no pteroyldiglutamylglutamic acid was obtained. It is desirable, therefore, that the amino acid content of the liquor should be less than the carbohydrate content. It has been found that very small amounts of amino acids, for example less than about 0.1% of glycine, give inadequate yields of pteroyldiglutamylglutamic acid. I prefer, therefore, that the growth medium contain from about 0.1% to not more than about 2% of available amino acids.

Thiamine, vitamin $B_1$, may be used to advantage in the growth liquor, experiments having shown that small amounts of this substance, from about 10 to 100 $\mu$g. (micrograms) increase pteroyldiglutamylglutamic acid production. Since many naturally-occurring materials, particularly of animal origin, contain small amounts of thiamine; and as these materials may be used in the growth liquor, it is not always necessary to add thiamine to the fermentation liquor. Thiamine as such is not necessary since I have found that other substances containing the pyrimidine nucleus, such as thymine and uracil, may be used in place of thiamine. When thiamine is degraded, as by heating, the residual material which contains a pyrimidine nucleus is still effective in increasing the yield of pteroyldiglutamylglutamic acid. Accordingly, to obtain best yields it is desirable that some substance having the pyrimidine nucleus be present in the growth medium. Therefore, in place of thiamine I may use various pyrimidines such as methyl pyrimidine, di-hydroxy pyrimidines (uracils), dimethyl di-hydroxy pyrimidines, aminopyrimidines, amino hydroxy pyrimidines, and the like.

I have also discovered that increased yields of pteroyldiglutamylglutamic acid are obtained when the fermentation liquor is aerated during the fermentation process. The extent of the aeration depends somewhat upon the efficiency of the aeration apparatus, and it is not possible to give accurate figures concerning the optimum amount of air required. However, in one series of experiments best results were obtained when 5 liters of liquor were aerated at a rate of 0.4 cu. ft. of air per minute. A smaller amount of air, 0.1 cu. ft. per minute, gave a substantial production of pteroyldiglutamylglutamic acid but much less than was obtained with a larger air flow. In general, I aerate at the rate of about 0.02 to 0.2 cu. ft. of air per liter of growth liquor per minute.

The pH of the growth medium should be between about 6.4 and 8.5 at the beginning of the fermentation process. Ordinarily, the pH rises slightly as the fermentation proceeds, and the liquor has a pH of from 7.0 to 9.0 at the end. However, it has been observed that the pH may fluctuate considerably during the fermentation and may even go as low as about pH 4, and pteroyldiglutamylglutamic acid is obtained in good yields nevertheless. As stated above, the pH may be regulated by a proper selection of phosphate salts, mixtures of di-hydrogen and mono-hydrogen phosphates being chosen so as to give the desired pH values in the fermentation liquor.

To illustrate in greater detail the fermentation process of the present invention the following procedure, which may be regarded as typical, was employed. Two solutions are prepared having the following proportions of constituents:

*Solution A*

| | | |
|---|---|---|
| $K_2HPO_4$ | mg | 75 |
| $KH_2PO_4$ | mg | 75 |
| $MgSO_4.7H_2O$ | mg | 30 |
| Glycine | mg | 800 |
| Thiamine | mg | 40 |
| Tap water | ml | 90 |

*Solution B*

| | | |
|---|---|---|
| Glucose | g | 4 |
| $FeSO_4.7H_2O$ | mg | 5 |
| Tap water | ml | 10 |

Solution A and Solution B were autoclaved separately and then cooled and mixed. To the resulting solution at 30° C. is added a culture of the chromogenic *Corynebacterium hofmannii*, strain variant previously described. Other Corynebacteria may be used on this or more complex media, with less efficient results.

The Corynebacterium inoculum is obtained in known manner. The original culture of the desired species is grown on an agar slant made from a basal nutrient solution, such as that described above, with 2% agar. One such slant is used to inoculate 100 cc. of medium. The organism is allowed to grow for 24 hours at 30° C. with shaking. The culture is then transferred to 5 liters of the medium and is allowed to grow for one day with aeration. The resulting 5-liter inocula is then used to inoculate larger tanks.

The principal fermentation is conducted at a temperature between about 20° C. and 40° C., preferably from about 25° C. to 37° C. During the first 50 to 80 hours most of the pteroyldiglutamylglutamic acid is produced. At 96 hours under favorable conditions the maximum production is obtained. No harm is done if the fermentation time exceeds 96 hours, and in plant production the usual fermentation period will be about 120 hours, or 5 days.

After the fermentation has progressed for the desired length of time, the solution is adjusted to a pH of about 6.3. It is then autoclaved at 120° C. for about 1 hour to release pteroyldiglutamylglutamic acid from the bacterial cells. The pH of the autoclaved solution is then adjusted to between 8 and 9, and calcium pyrophosphate is added to coagulate the cells. Regulation of the pH at this point to above 6.0 is desirable since it has been found that at a pH below 6 pteroyldiglutamylglutamic acid is adsorbed on the cell debris.

The solution is next filtered at a pH of 8 to 9 and then adjusted to a pH of about 3 with hydrochloric or sulfuric acid.

Six grams of charcoal, or other suitable adsorbent, is then added for each liter of liquor and the mixture agitated, filtered, and the cake washed with 50% ethyl alcohol at 75° C. to remove pigments and other undesirable components from the adsorbent charcoal. The washed filter cake is then eluted twice with a solution made up of 50 parts of 50% ethyl alcohol, 10 parts of concentrated ammonium hydroxide, and 40 parts of water.

The eluate is then adjusted to a pH of about 8 with hydrochloric acid, and ethyl alcohol is added to a concentration of about 75%. Barium chloride is then added, and the mixture is allowed to stand overnight in a cold room. This step results in the precipitation of the crude barium salt of pteroyldiglutamylglutamic acid. For some purposes, such as in the fortification of animal foods, the crude product may be used at this stage of the operation, or even earlier. For a product of higher purity, however, it is desirable to continue the purification process.

Further purification may be brought about by esterifying the crude pteroyldiglutamylglutamic acid. This may be accomplished by treating an aqueous slurry of the crude barium chloride precipitate with concentrated hydrochloric acid and methanol at an acidity corresponding to about 0.1 normal with respect to hydrochloric acid. To bring about esterification, the mixture is agitated for 8 to 10 hours at 30° C. and then allowed to stand overnight with additional heating and agitation if necessary.

The solution is then adjusted to a pH of from 4 to 5 with aqueous sodium hydroxide, and the sodium chloride which separates is removed. The solvent is then evaporated from the crude pteroyldiglutamylglutamic acid ester, and the product is dissolved in water. The aqueous solution is then extracted with butanol and the butanol fraction concentrated, washed with water, and then evaporated to dryness.

The residue remaining after evaporation of the butanol is dissolved in the minimum amount of hot methanol. This solution is then cooled, and the pteroyldiglutamylglutamic acid ester which precipitates is centrifuged out.

The crude ester, after being washed free of methanol, is then treated with 0.1 normal solution of barium hydroxide, whereupon the ester is hydrolyzed almost immediately. The solution is then treated with an activated earth and then filtered. The filtrate is concentrated and treated with barium chloride, and the solution allowed to stand at 0° C. overnight. The precipitate which forms contains all the pteroyldiglutamylglutamic acid as the barium salt. Pteroyldiglutamylglutamic acid may be recovered therefrom by treatment of an aqueous suspension of the salt with 1 normal hydrochloric acid to a pH of 3.0. After the solution is cooled, the free acid is found as an insoluble material which may be recovered by centrifuging. Repeated recrystallization of the pteroyldiglutamylglutamic acid produces pteroyldiglutamylglutamic acid in an exceptionally high degree of purity.

I claim:
1. A process of producing the physiologically active substance, pteroyldiglutamylglutamic acid, which comprises the steps of inoculating a growth medium with a non-pathogenic microorganism of the genus Corynebacterium, allowing fermentation to take place, and separating pteroyldiglutamylglutamic acid from the fermented medium.

2. A process of producing the physiologically active substance, pteroyldiglutamylglutamic acid, which comprises the steps of inoculating a growth medium with a non-pathogenic chromogenic C. hofmannii microorganism allowing fermentation to take place, and separating pteroyldiglutamylglutamic acid from the fermented medium.

3. A process of producing a physiologically active substance which comprises the steps of inoculating a liquid growth medium with a non-pathogenic microorganism of the genus Corynebacterium and allowing fermentation to take place at a temperature within the range of about 20° to about 40° C. for a period of time between 50 and 120 hours while blowing air through the medium.

4. A process of producing the physiologically active substance, pteroyldiglutamylglutamic acid, which comprises the steps of inoculating a growth medium with a non-pathogenic microorganism of the genus Corynebacterium, allowing fermentation to take place, destroying the bacterial cells therein to release pteroyldiglutamylglutamic acid, and thereafter recovering the pteroyldiglutamylglutamic acid from the medium by adsorption on an adsorbent.

5. In the method of producing the physiologically active substance, pteroyldiglutamylglutamic acid, which comprises fermenting a growth medium inoculated with a non-pathogenic microorganism of the genus Corynebacterium, the step which comprises aerating the medium at the rate of about 0.02 to 0.2 cu. ft. of air per liter of growth medium per minute.

6. A process of producing pteroyldiglutamylglutamic acid which comprises the steps of growing a non-pathogenic microorganism of the genus Corynebacterium on a liquid growth medium comprising for each 100 ml. thereof 0.1 mg. to 20 mg. of iron, expressed as ferrous sulfate heptahydrate, 25 mg. to 200 mg. of phosphates, expressed as dipotassium mono-hydrogen phosphate, 1 g. to 4 g. of a water-soluble monosaccharide, 0.1 g. to 2 g. of available amino acids, 10 to 100 micrograms of thiamine, said growth medium having a pH of between about 6.4 and 9.0, and thereafter isolating pteroyldiglutamylglutamic acid from the fermented liquid.

7. In a process of producing pteroyldiglutamylglutamic acid in which a water-soluble carbohydrate medium is fermented to produce pteroyldiglutamylglutamic acid and the resulting pteroyldiglutamylglutamic acid is adsorbed from said medium on charcoal, the improvement which comprises preparing a growth medium containing not more than about 4% by weight of a water-soluble carbohydrate, inoculating said medium with a non-pathogenic microorganism of the genus Corynebacterium which produces pteroyldiglutamylglutamic acid by fermentation of said medium, allowing fermentation of said medium to take place until substantially all of the carbohydrate has been eliminated therefrom and thereafter removing the pteroyldiglutamylglutamic acid from the medium by adsorption on charcoal.

8. The new product pteroyldiglutamylglutamic acid having the structural formula

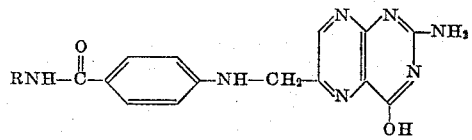

in which the group RNH is a radical of diglutamylglutamic acid and the cationic salts thereof.

9. The new product N-[4-{[(2-amino-4-hydroxy-6-pteridyl)methyl]amino}benzoyl] diglutamylglutamic acid having the structural formula

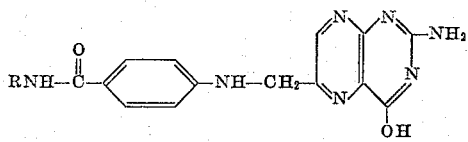

in which the group RNH is a radical of diglutamylglutamic acid.

10. The alkaline earth metal salts of the acid of claim 9.

11. The barium salt of the acid of claim 9.

BRIAN L. HUTCHINGS.

REFERENCES CITED

The following references are of record in the file of this patent:

Levine et al., A Compilation of Culture Media for the Cultivation of Microorganisms, vol. II, 1930, Wms. & Wilkins Co., pp. 42, 644, 652 (1930).

Chem. Abst. 32,5025 (7–9), Oxygen uptake of washed suspension of *Corynebacterium diphtheriae* in presence of glucose and glycogen, J. Path. Bact. 46, 303–308 (1938). Metabolism of washed suspensions of *C. Hofmanni*. Op. cit., 309–314 (1938).

Chem. Abst. 33,7836, Sulfur, Iron, and Magnesium Requirement of Moderate Strains of *Bacillus diphtheriae*. H. Braun, Schweiz Z. Allgem. Path. Bakt. 1, 113–120 (1938).

Hutchins et al., Science, 103, May 31, 1946, page 667.

J. Am. Chem. Soc., 68, 1392 (1946); Science, 103, 667 (1946); Science, 99, 371 (1944).